US012711370B2

(12) United States Patent
Schmidt et al.

(10) Patent No.: US 12,711,370 B2
(45) Date of Patent: Aug. 18, 2026

(54) METHOD FOR TRAINING A NEURAL NETWORK

(71) Applicant: Robert Bosch GmbH, Stuttgart (DE)

(72) Inventors: Frank Schmidt, Leonberg (DE); Torsten Sachse, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1334 days.

(21) Appl. No.: 17/295,434

(22) PCT Filed: Nov. 28, 2019

(86) PCT No.: PCT/EP2019/082837
§ 371 (c)(1),
(2) Date: May 20, 2021

(87) PCT Pub. No.: WO2020/126378
PCT Pub. Date: Jun. 25, 2020

(65) Prior Publication Data

US 2021/0406684 A1 Dec. 30, 2021

(30) Foreign Application Priority Data

Dec. 19, 2018 (DE) ........................ 102018222347.5

(51) Int. Cl.
*G06F 18/21* (2023.01)
*G06F 18/213* (2023.01)
*G06F 18/241* (2023.01)
*G06N 3/08* (2023.01)

(52) U.S. Cl.
CPC ............ *G06N 3/08* (2013.01); *G06F 18/213* (2023.01); *G06F 18/241* (2023.01)

(58) Field of Classification Search
CPC ............................... G06N 3/08; G06F 18/241
See application file for complete search history.

(56) References Cited

U.S. PATENT DOCUMENTS 6,282,529 B1 8/2001 Neuneier et al.

FOREIGN PATENT DOCUMENTS

CN 108015765 A 5/2018
CN 108015766 A 5/2018
CN 108229539 A 6/2018
(Continued)

OTHER PUBLICATIONS

Wang, "The Effectiveness of Data Augmentation in Image Classification using Deep Learning", 2017 (Year: 2017).*
(Continued)

*Primary Examiner* — Van C Mang
(74) *Attorney, Agent, or Firm* — NORTON ROSE FULBRIGHT US LLP

(57) ABSTRACT

A computer-implemented method for training a neural network, which, in particular, is configured to classify physical measuring variables. The neural network is trained with the aid of a training data set. Pairs including an input signal and an associated desired output signal are drawn from the training data set for training. An adaptation of parameters of the neural network occurs as a function of an output signal of the neural network, when the input signal is supplied, and as a function of the desired output signal. The drawing of pairs always takes place from the entire training data set.

9 Claims, 16 Drawing Sheets

(56) References Cited

FOREIGN PATENT DOCUMENTS

| | | | |
|---|---|---|---|
| CN | 108520155 | A | 9/2018 |
| CN | 108710950 | A | 10/2018 |
| DE | 19635758 | C1 | 11/1997 |
| DE | 19721067 | C1 | 9/1998 |
| TW | 201636905 | A | 10/2016 |
| WO | 9708627 | A1 | 3/1997 |
| WO | 2016145516 | A1 | 9/2016 |

OTHER PUBLICATIONS

Francisco, "Smart sensor/actuator node reprogramming in changing environments using a neural network model" (Year: 2014).*

Guillot, "Iterative Thresholding Algorithm for Sparse Inverse Covariance Estimation", 2012 (Year: 2012).*

Chen, et al.: "Remote Sensing Image Pixel-level Classification with Genetic Algorithm and Fully Convolutional Network," Journal of Chinese Computer Systems, 39(7), (2018), pp. 1590-1595, with English Abstract.

Lin, et al.: "Research on ATC's Intelligent Conflict Release Module Based on Neural Network," Aeronautical Computing Technique 48(1), (2018), pp. 82-90, with English Abstract.

International Search Report for PCT/EP2019/082837, Issued Feb. 25, 2020.

Shijie et al., "Research On Data Augmentation for Image Classification Based on Convolution Neural Networks," Chinese Automation Congress (CAC), IEEE, 2017, pp. 4165-4170.

Buda et al., "A Systematic Study of the Class Imbalance Problem in Convolutional Neural Networks," Cornell University Library, 2018, pp. 1-21.

Katharopoulos et al., "Not All Samples Are Created Equal: Deep Learning With Importance Sampling," Cornell University Library, 2019, pp. 1-13.

Ioffe et al., "Batch Normalization: Accelerating Deep Network Training By Reducing Internal Covariate Shift," Proceedings of Machine Learning Research (PMLR), Proceedings of the International Conference on Machine Learning (ICML 2015), vol. 37, 2015. pp. 1-9.

Hinton et al., "Improving Neural Networks by Preventing Co-Adaptation of Feature Detectors," Cornell University Library, 2012, pp. 1-36, <http://arxiv.org/abs/1207.0580vl>.

Shijie, et al.: "Research on Data Augmentation for Image Classification Based on Convolution Neural Networks," 2017 Chinese Automation Congress, CAC, pp. 4165-4170.

* cited by examiner

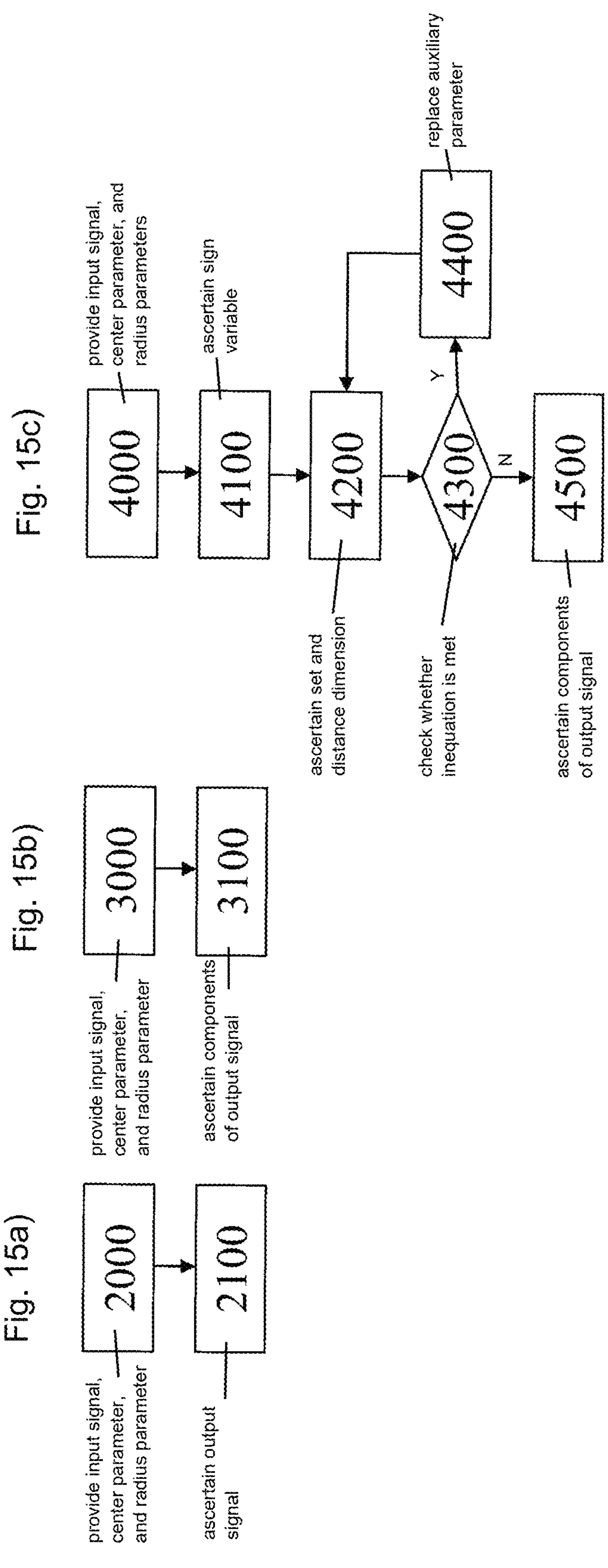
Fig. 15a)
2000
provide input signal, center parameter, and radius parameter
2100
ascertain output signal
Fig. 15b)
3000
provide input signal, center parameter, and radius parameter
3100
ascertain components of output signal
Fig. 15c)
4000
provide input signal, center parameter, and radius parameters
4100
ascertain sign variable
4200
ascertain set and distance dimension
4300
check whether inequation is met
Y
N
4400
replace auxiliary parameter
4500
ascertain components of output signal

METHOD FOR TRAINING A NEURAL NETWORK

FIELD

The present invention relates to a method for training a neural network, to a training system, to uses of the neural network thus trained, to a computer program, and to a machine-readable memory medium.

BACKGROUND INFORMATION

A method for training neural networks is described in "Improving neural networks by preventing co-adaptation of feature detectors," arXiv preprint arXiv:1207.0580v1, Geoffrey E. Hinton, Nitish Srivastava, Alex Krizhevsky, Ilya Sutskever, Ruslan R. Salakhutdinov (2012), in which feature detectors are randomly ignored during the training. These methods are also known under the name "dropout."

A method for training neural networks is described in "Batch Normalization: Accelerating Deep Network Training by Reducing Internal Covariate Shift," arXiv preprint arXiv: 1502.03167v3, Sergey Ioffe, Christian Szegedy (2015), in which input variables are normalized in a layer for a small batch ("mini batch") of training examples.

SUMMARY

A method in accordance with an example embodiment of the present invention may have the advantage over the related art that a guaranteeable reliability of the trained system results, which is, in particular, essential for safety-critical applications. Surprisingly, this advantage arises without having to tolerate a worsening in the performance capability achievable at the training end (e.g., during the classification of images).

Refinements and example embodiments of the present invention are described herein.

With a sufficiently large number of training data, so-called "deep learning" methods, i.e., (deep) artificial neural networks, may be used to efficiently ascertain a map between an input space $V_0$ and an output space $V_k$. This may, for example, be a classification of sensor data, in particular, image data, i.e., a mapping of sensor data or image data to classes. This is based on the approach of providing a k−1 number of hidden spaces $V_1, \ldots, V_{k-1}$. Furthermore, a k number of maps $f^i: V_{i-1} \rightarrow V_i$ ($i=1 \ldots k$) are provided between these spaces. Each of these maps $f^i$ is typically referred to as a layer. Such a layer $f^i$ is typically parameterized by weights $w_i \in W^i$ having a suitable selected space $W^i$. Weights $w_1, \ldots, w_k$ of the k number of layers $f^i$ are collectively also referred to as weights $w \in W := W^1 \times \ldots \times W^k$, and the mapping from input space $V_0$ to output space $V_k$ is referred to as $f_w: V_0 \rightarrow V_k$, which from the individual maps $f^i$ (with weights $w_i$ explicitly indicated as subscript) results as $$f_w(x) := f_{w_k}^k \circ \ldots \circ f_{w_1}^1(x).$$

At a given probability distribution D, which is defined as $V_0 \times V_k$, the task of training the neural network is to determine weights $w \in W$ in such a way that an expected value $\Phi$ of a cost function L $$\Phi[w] = E_{(x_D, y_D) \sim D}[L(f_w(x_D), y_D)] \quad (1)$$

is minimized. In the process, cost function L denotes a measure for the distance between the map, ascertained with the aid of function $f_w$, of an input variable $x_D$ to a variable $f_w(x_D)$ in output space $V_k$ and an actual output variable $y_D$ in output space $V_k$.

A "deep neural network" may be understood to mean a neural network including at least two hidden layers.

To minimize this expected value $\Phi$, gradient-based methods may be utilized, which ascertain a gradient $\nabla\Phi$ with respect to weights w. This gradient $\nabla\Phi$ is usually approximated with the aid of training data $(x_j, y_j)$, i.e., by $\nabla_w L(f_w(x_j, y_j))$, indices j being selected from a so-called epoch. An epoch is a permutation of labels $\{1, \ldots, N\}$ of the available training data points.

To expand the training data set, so-called data augmentation (also referred to as augmentation) may be utilized. In the process, it is possible to select an augmented pair $(x_a, y_j)$ for each index j from the epoch instead of pair $(x_j, y_j)$, input signal $x_j$ being replaced by an augmented input value $x_a \in \alpha(x_j)$ here. In the process, $\alpha(x_j)$ may be a set of typical variations of input signal $x_j$ (including input signal $x_j$ itself) which leave a classification of input signal $x_j$, i.e., the output signal of the neural network, unchanged.

This epoch-based sampling, however, is not entirely consistent with the definition from equation (1) since each data point is selected exactly one time during the course of an epoch. The definition from equation (1), in contrast, is based on independently drawn data points. This means that while equation (1) requires the data points to be drawn "with replacement," the epoch-based sampling carries out a drawing of the data points "without replacement." This may result in the requirements of mathematical convergence proofs not being met (because, when selecting N examples from a set of a N number of data points, the probability of selecting each of these data points exactly once is less than $$e^{-\frac{N}{2}}$$

(for N>2), while this probability is always equal to 1 in the case of epoch-based sampling.

If data augmentation is utilized, this statistical effect may be further amplified since an element of set $\alpha(x_j)$ is present in each epoch and, depending on augmentation function $\alpha$, it cannot be excluded that $\alpha(x_j) \approx \alpha(x_i)$ for $i \neq j$. Statistically correct mapping of the augmentations with the aid of set $\alpha(x_j)$ is difficult since the effect does not have to be equally pronounced for each input datum $x_j$. In this way, for example, a rotation may have no impact on circular objects, but may greatly impact general objects. As a result, the size of set $\alpha(x_j)$ may be dependent on input datum $x_j$, which may be problematic for adversarial training methods.

After all, number N of the training data points is a variable which, in general, is complex to set. If N is selected to be too large, the run time of the training method may be unduly extended, if N is selected to be too small, a convergence cannot be guaranteed since mathematical proofs of the convergence, in general, are based on assumptions which are then not met. In addition, it is not clear at what point in time the training is to be reliably terminated. When taking a portion of the data points as an evaluation data set and determining the quality of the convergence with the aid of this evaluation data set, the result may be that overfitting of the weights w occurs with respect to the data points of the evaluation data set, which not only reduces the data efficiency, but may also impair the performance capability of the network when it is applied to data other than training data. This may result in a reduction of the so-called "generalizability."

To reduce overfitting, a piece of information which is stored in the hidden layers may be randomly thinned with the aid of the "dropout" method mentioned at the outset.

To improve the randomization of the training process, it is possible, through the use of so-called batch normalization layers, to introduce statistical parameters $\mu$ and $\sigma$ over so-called mini batches, which are probabilistically updated during the training process. During the inference, the values of these parameters $\mu$ and $\sigma$ are selected as fixedly predefinable values, for example as estimated values from the training through extrapolation of the exponential decay behavior.

If the layer having index i is a batch normalization layer, the associated weights $w_i=(\mu_i,\sigma_i)$ are not updated in the case of a gradient descent, i.e., these weights $w_i$ are thus treated differently than weights $w_k$ of the remaining layers k. This increases the complexity of an implementation.

In addition, the size of the mini batches is a parameter which in general influences the training result and thus, as a further hyperparameter, must be set as well as possible, for example within the scope of a (possibly complex) architecture search.

In a first aspect, the present invention thus relates to a method for training a neural network which is, in particular, configured to classify physical measuring variables, the neural network being trained with the aid of a training data set X, pairs including an input signal and an associated desired output signal being (randomly) drawn from the training data set for training, an adaptation of parameters of the neural network taking place as a function of an output signal of the neural network, when the output signal is supplied, and as a function of the desired output signal, this drawing of pairs always occurring from the entire training data set.

In one preferred refinement of this aspect of the present invention, it is provided that the drawing of pairs occurs regardless of which pair was previously drawn during the course of the training.

In other words, the sampling of pairs, i.e., data points, from the training data set corresponds to a "drawing with replacement." This breaks with the existing paradigm that the training examples of the training data set are drawn by "drawing without replacement." This "drawing with replacement" may initially appear to be disadvantageous since it cannot be guaranteed that every data point from the training data set is actually used within a given number of training examples.

With this, a guaranteeable reliability of the trained system results, which is essential, in particular, for a safety-critical use. Surprisingly, this advantage arises without having to tolerate a worsening in the performance capability achievable at the training end (e.g., during the classification of images). In addition, an interface to other sub-blocks of a training system with which the neural network is trainable is drastically simplified.

The drawn pairs may optionally also be further augmented. This means that a set of augmentation functions may be provided for some or all of the input signals included in the training data set (as a component of the pairs), to which the input signal may be subjected. The selection of the corresponding augmentation function may also take place randomly, preferably regardless of which pairs and/or which augmentation functions were previously drawn during the course of the training.

In one refinement of the present invention, it may be provided that the input signal of the drawn pair is augmented using augmentation function $\alpha_i$, i.e., that the input signal is replaced by its image under the augmentation function.

It is preferably provided in the process that augmentation function $\alpha_i$ is selected, in particular randomly, from the set $\alpha$ of possible augmentation functions, this set being dependent on the input signal.

In the process, it may be provided that, during the random drawing of pairs from the training data set, a probability that a predefinable pair is drawn is dependent on a number of possible augmentation functions $\alpha$ of the input signal of this predefinable pair.

For example, the probability may be a predefinable variable. In particular, the probability is advantageously selected to be proportional to the number of possible augmentation functions. This makes it possible to adequately take into consideration that some augmentation functions leave the input signal unchanged, so that the cardinal number of the set (i.e., the number of the elements of the set) of the augmentation functions between the input signals may be very different. As a result of the adequate consideration, possible problems with adversarial training methods may be avoided. This may be understood as follows: With a given input signal, an adversarial input signal may be generated with the aid of a suitable augmentation function in the case of adversarial training methods, which has a sufficiently small distance of smaller than a maximum distance r from the given input signal. If two input signals are permitted, which have a small distance (smaller than twice the maximum distance) from one another, it is possible that the sets of the adversarial input signals overlap, so that the adversarial training methods may be overrepresented, provided that this overlap is not adequately taken into consideration. This is achieved by the described method.

In another aspect of the refinements of the present invention, it may be provided that the adaptation of the parameters takes place as a function of an ascertained gradient and, for the ascertainment of the gradient, an estimated value $m_1$ of the gradient is refined, by taking a successively increasing number of pairs which are drawn from the training data set into consideration, until a predefinable termination condition which is dependent on estimated value $m_1$ of the gradient is met.

This means, in particular, that the adaptation of the parameters only takes place after the predefinable termination condition has been met.

This is in contrast to conventional methods from the related art, such as stochastic gradient descent, in which an averaging of the gradient always takes place over a predefinable mini batch. This mini batch has a predefinable size which may be set as a hyperparameter. By successively adding pairs from the training data set, it is possible in the described method to carry out the ascertainment until the gradient reliably points in the ascending direction.

In addition, the size of the mini batch is a hyperparameter to be optimized. As a result of being able to dispense with this optimization, the method is more efficient and more reliable since overfitting may be suppressed more effectively, and the batch size is dispensed with as a hyperparameter.

In particular, the predefinable termination condition may also be dependent on a covariance matrix C of estimated value $m_1$ of the gradient.

In this way, it is possible to ensure particularly easily that the gradient reliably points in the ascending direction.

For example, the predefinable termination condition may encompass the condition whether estimated value $m_1$ and covariance matrix C for a predefinable confidence value $\lambda$ meet condition $\langle m_1, C^{-1}{}_{m_1}\rangle \geq \lambda^2$.

A probabilistic termination criterion is thus introduced with this condition. In this way, it is possible to ensure with predefinable confidence that the gradient, with confidence value $\lambda$, points in the ascending direction.

In one further aspect of the refinements of the present invention, it may be provided that the components of the ascertained gradient are scaled as a function of to which layer of the neural network the parameters corresponding to these components belong.

In this connection, "scaling" shall be understood to mean that the components of the ascertained gradient are multiplied with a factor which is dependent on the layer.

In particular, the scaling may take place as a function of a position, i.e., the depth, of this layer within the neural network.

The depth may, for example, be characterized, in particular, given, by the number of layers through which a signal which is supplied to an input layer of the neural layer has to propagate before it is present for the first time as an input signal at this layer.

In one refinement of the present invention, it may be provided that the scaling also occurs as a function of to which feature of a feature map the corresponding component of the ascertained gradient belongs.

In particular, it may be provided that the scaling occurs as a function of a size of a receptive field of this feature.

It was found that, in particular, in a convolutional network, weights of a feature map are cumulatively multiplied with pieces of information of the features of the receptive field, which is why overfitting may form for these weights. This is effectively suppressed by the described method.

In one particularly simple and efficient alternative of the present invention, it may be provided that the scaling occurs as a function of the resolution of this layer. In particular, that it occurs as a function of a quotient of the resolution of this layer and the resolution of the input layer.

It was found that, in this way, the size of the receptive field may be approximated very easily and efficiently.

In another aspect of the refinements of the present invention, it may be provided that the neural network includes a scaling layer, the scaling layer mapping an input signal present at the input of the scaling layer in such a way to an output signal present at the output of the scaling layer that the output signal present at the output represents a rescaled signal of the input signal, parameters which characterize the rescaling being fixedly predefinable.

Preferably, it may be provided here that the scaling layer maps an input signal present at the input of the scaling layer in such a way to an output signal present at the output of the scaling layer that this mapping corresponds to a projection to a ball, center c and/or radius p of this ball being fixedly predefinable. As an alternative, it is also possible that these parameters, as well as other parameters of the neural network, may be adapted during the course of the training.

In the process, the mapping may be given by equation $y=\mathrm{argmin}_{N_1(y-c)\leq\rho}N_2(x-y)$ using a first norm ($N_1$) and a second norm ($N_2$). The term "norm" shall be understood in the mathematical sense in the process.

In one refinement of the present invention which may be computed particularly efficiently, it may be provided that first norm $N_1$ and second norm $N_2$ are selected to be identical.

As an alternative or in addition, first norm $N_1$ may be an $L^\infty$ norm. This norm may also be computed particularly efficiently, in particular, also when first norm $N_1$ and second norm $N_2$ are selected to be dissimilar.

As an alternative, it may be provided that first norm $N_1$ is an L norm. This selection of the first norm favors the sparsity of the output signal of the scaling layer. This is advantageous, for example, for the compression of neural networks since weights having the value 0 do not contribute to the output value of their layer.

A neural network including such a layer may thus be used in a particularly memory-efficient manner, in particular in conjunction with a compression method.

In the described variants for first norm $N_1$ in accordance with example embodiments of the present invention, it may advantageously be provided that second norm $N_2$ is an $L^2$ norm. In this way, the methods may be implemented particularly easily.

It is particularly advantageous in the process when equation $y=\mathrm{argmin}_{N_1(y-c)\leq\rho}N_2(x-y)$ is solved with the aid of a deterministic Newton's method.

Surprisingly, it was found that this method is particularly efficient when an input signal including many important, i.e., heavily weighted, features is present at the input of the scaling layer.

Specific embodiments of the present invention are described hereafter in greater detail with reference to the figures.

BRIEF DESCRIPTION OF THE DRAWINGS

FIGS. 15*a*), 15*b*), and 15*c*) show specific embodiments for implementing a scaling layer within the neural network in flowcharts, in accordance with the present invention.

DETAILED DESCRIPTION OF EXAMPLE EMBODIMENTS

Figure 1:
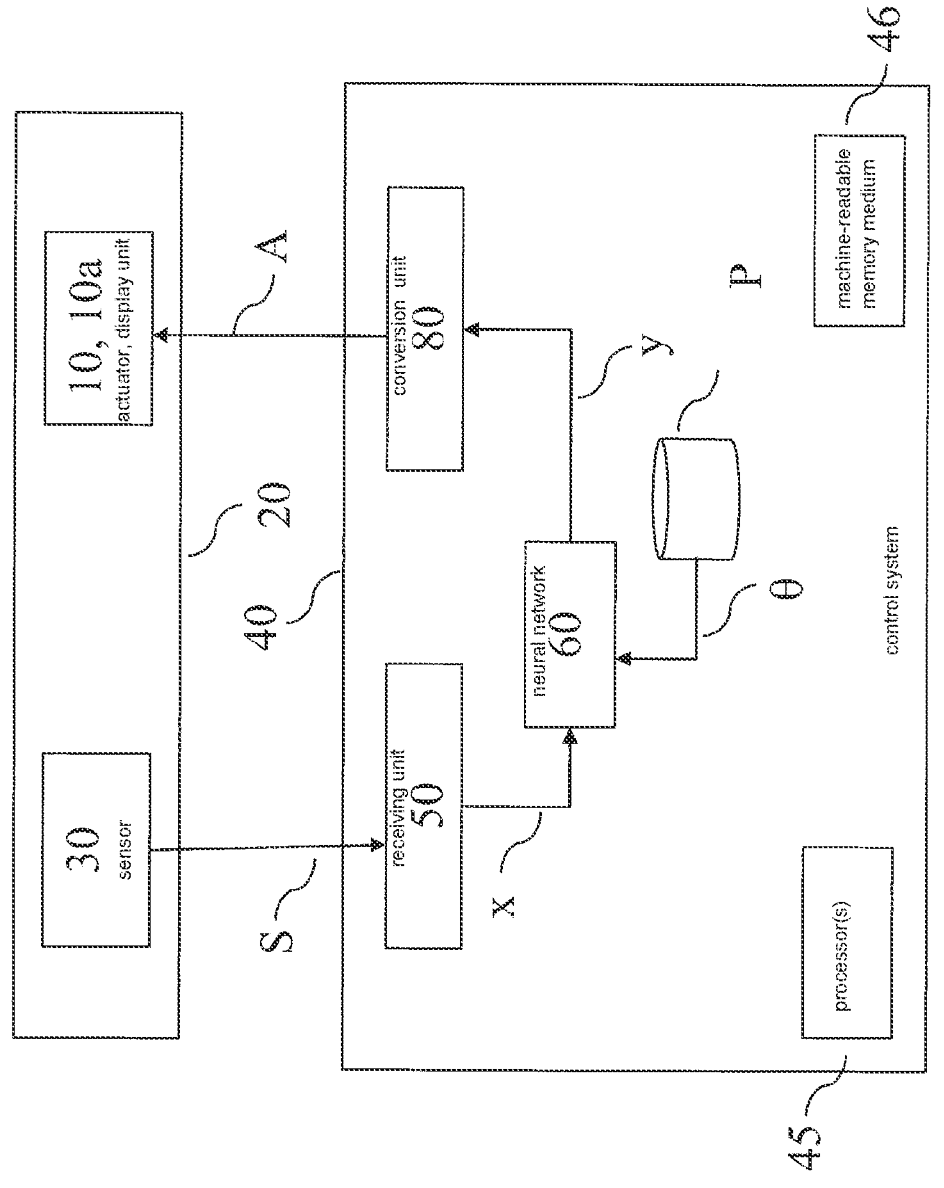
FIG. 1 schematically shows a design of one specific embodiment of a control system, in accordance with the present invention.

FIG. 1 shows an actuator 10 in its surroundings 20 in interaction with a control system 40. Actuator 10 and surroundings 20 are collectively also referred to as an actuator system. A state of the actuator system is detected at preferably regular intervals by a sensor 30, which may also be a multitude of sensors. Sensor signal S, or in the case of multiple sensors a respective sensor signal S, of sensor 30 is transmitted to control system 40. Control system 40 thus receives a sequence of sensor signals S. Control system 40 ascertains activation signals A therefrom, which are transferred to actuator 10.

Sensor 30 is an arbitrary sensor, which detects a state of surroundings 20 and transmits it as sensor signal S. It may be an imaging sensor, for example, in particular, an optical sensor such as an image sensor or a video sensor, or a radar sensor, or an ultrasonic sensor, or a LIDAR sensor. It may also be an acoustic sensor, which receives structure-borne noise or voice signals, for example. The sensor may also be a position sensor (such as for example GPS), or a kinematic sensor (for example a single-axis or multi-axis acceleration sensor). A sensor which characterizes an orientation of actuator 10 in surroundings 20 (for example a compass) is also possible. A sensor which detects a chemical composition of surroundings 20, for example a lambda sensor, is also possible. As an alternative or in addition, sensor 30 may also include an information system which ascertains a piece of information about a state of the actuator system, such as for example a weather information system which ascertains an instantaneous or future state of the weather in surroundings 20.

Control system 40 receives the sequence of sensor signals S of sensor 30 in an optional receiving unit 50, which converts the sequence of sensor signals S into a sequence of input signals x (alternatively, it is also possible to directly adopt the respective sensor signal S as input signal x). Input signal x may, for example, be a portion or a further processing of sensor signal S. Input signal x may, for example, encompass image data or images, or individual frames of a video recording. In other words, input signal x is ascertained as a function of sensor signal S. Input signal x is supplied to a neural network 60. Neural network 60 is preferably parameterized by parameters θ, for example encompassing weights w which are stored in a parameter memory P and provided thereby.

Neural network 60 ascertains output signals y from input signals x. Output signals y typically encode a piece of classification information of input signal x. Output signals y are supplied to an optional conversion unit 80, which ascertains activation signals A therefrom, which are supplied to actuator 10 to accordingly activate actuator 10.

Actuator 10 receives activation signals A, is accordingly activated, and carries out a corresponding action. Actuator 10 may include a (not necessarily structurally integrated) activation logic, which ascertains a second activation signal, with which actuator 10 is then activated, from activation signal A.

In further specific embodiments of the present invention, control system 40 includes sensor 30. In still further specific embodiments of the present invention, control system 40 alternatively or additionally also includes actuator 10.

In further preferred specific embodiments of the present invention, control system 40 includes one or multiple processor(s) 45 and at least one machine-readable memory medium 46 on which instructions are stored which, when they are executed on processors 45, prompt control system 40 to execute the method for operating control system 40.

In alternative specific embodiments of the present invention, a display unit 10*a* is provided as an alternative or in addition to actuator 10.

Figure 2:
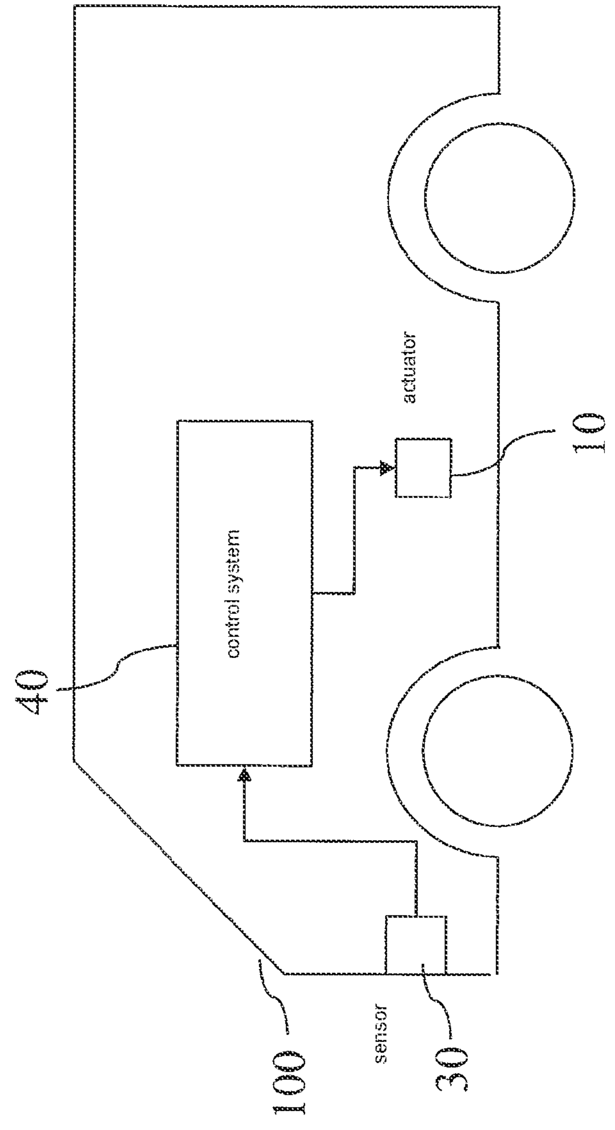
FIG. 2 schematically shows one exemplary embodiment for controlling an at least semi-autonomous robot, in accordance with the present invention.

FIG. 2 shows one exemplary embodiment in which control system 40 is used for controlling an at least semi-autonomous robot, here an at least partially automated motor vehicle 100.

Sensor 30 may be one of the sensors mentioned in connection with FIG. 1, preferably one or multiple video sensor(s), preferably situated in motor vehicle 100, and/or one or multiple radar sensor(s) and/or one or multiple ultrasonic sensor(s) and/or one or multiple LIDAR sensor(s) and/or one or multiple position sensor(s) (for example GPS).

Neural network 60 may, for example, detect objects in the surroundings of the at least one semi-autonomous robot from input data x. Output signal y may be a piece of information which characterizes where in the surroundings of the at least semi-autonomous robot objects are present. Output signal A may then be ascertained as a function of this piece of information and/or corresponding to this piece of information.

Actuator 10 preferably situated in motor vehicle 100 may, for example, be a brake, a drive or a steering system of motor vehicle 100. Activation signal A may then be ascertained in such a way that actuator or actuators 10 is/are activated in such a way that motor vehicle 100, for example, prevents a collision with the objects identified by neural network 60, in particular, when objects of certain classes, e.g., pedestrians, are involved. In other words, activation signal A may be ascertained as a function of the ascertained class and/or corresponding to the ascertained class.

As an alternative, the at least semi-autonomous robot may also be another mobile robot (not shown), for example one which moves by flying, swimming, diving or walking. The mobile robot may, for example, also be an at least semi-autonomous lawn mower or an at least semi-autonomous cleaning robot. Activation signal A may also be ascertained in these cases in such a way that the drive and/or steering system of the mobile robot is/are activated in such a way that the at least semi-autonomous robot, for example, prevents a collision with the objects identified by neural network 60.

In one further alternative, the at least semi-autonomous robot may also be a garden robot (not shown), which ascertains a type or a condition of plants in surroundings 20 using an imaging sensor 30 and neural network 60. Actuator 10 may then be an applicator of chemicals, for example. Activation signal A may be ascertained as a function of the ascertained type or the ascertained condition of the plants in such a way that an amount of the chemicals corresponding to the ascertained type or the ascertained condition is applied.

In still further alternatives, the at least semi-autonomous robot may also be a household appliance (not shown), in particular, a washing machine, a stove, an oven, a microwave or a dishwasher. Using sensor 30, for example an optical sensor, a state of an object treated with the household appliance may be detected, for example in the case of a washing machine, a state of the laundry situated in the washing machine. Using neural network 60, a type or a state of this object may then be ascertained and characterized by output signal y. Activation signal A may then be ascertained in such a way that the household appliance is activated as a function of the ascertained type or the ascertained state of the object. For example, in the case of the washing machine, the washing machine may be activated as a function of the material of which the laundry situated therein is made. Activation signal A may then be selected depending on which material of the laundry was ascertained.

Figure 3:
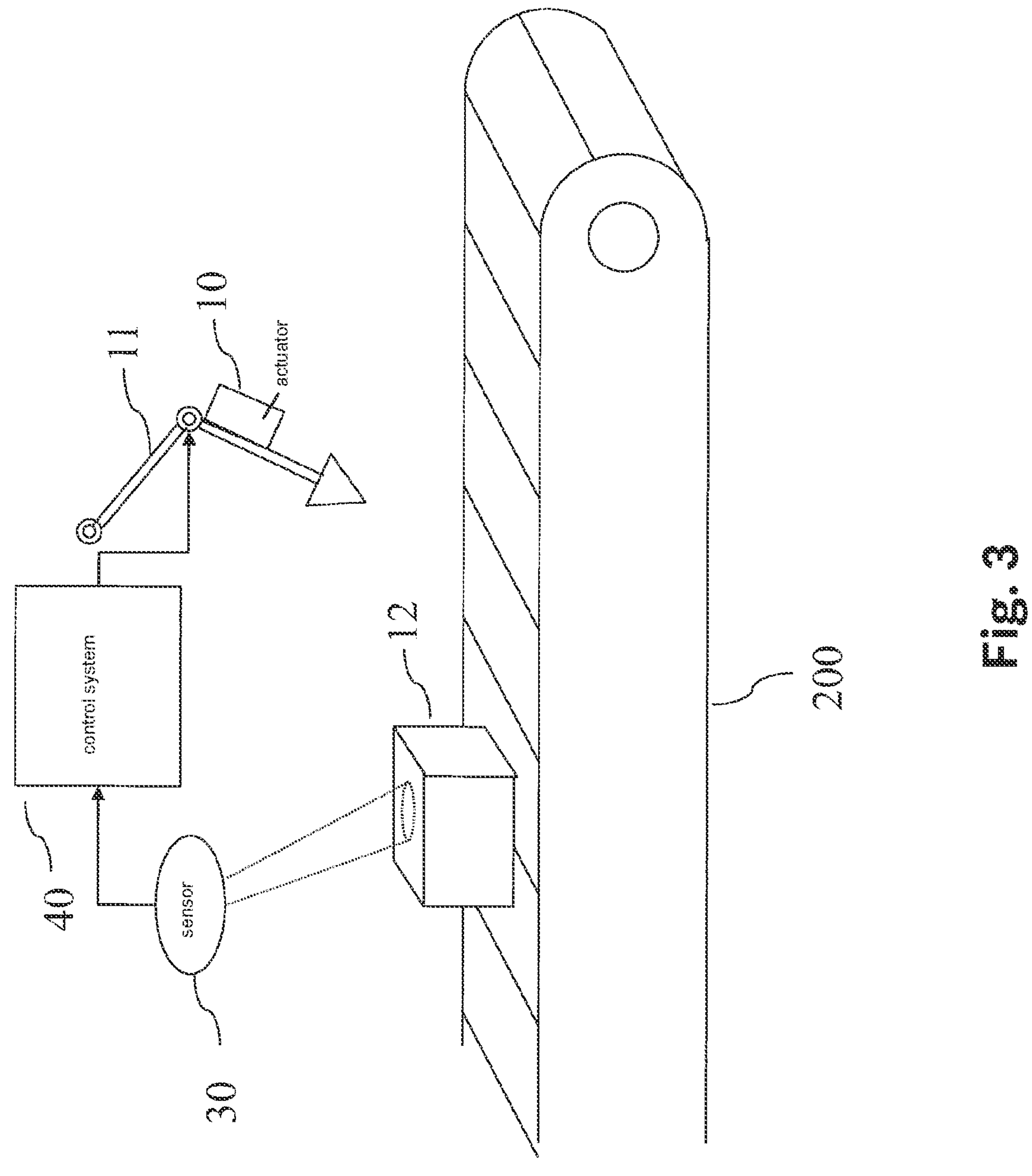
FIG. 3 schematically shows one exemplary embodiment for controlling a production system, in accordance with the present invention.

FIG. 3 shows one exemplary embodiment in which control system 40 is used for activating a manufacturing machine 11 of a manufacturing system 200, in that an actuator 10 controlling this manufacturing machine 11 is activated. Manufacturing machine 11 may, for example, be a machine for stamping, sawing, drilling and/or cutting.

Sensor 30 may be one of the sensors mentioned in connection with FIG. 1, preferably an optical sensor which, e.g., detects properties of manufacturing products 12. It is possible that actuator 10 controlling manufacturing machine 11 is activated as a function of the ascertained properties of manufacturing products 12, so that manufacturing machine 11 accordingly executes a subsequent processing step of these manufacturing products 12. It is also possible that sensor 30 ascertains the properties of manufacturing products 12 processed by manufacturing machine 11 and, as a function thereof, adapts an activation of manufacturing machine 11 for a subsequent manufacturing product.

Figure 4:
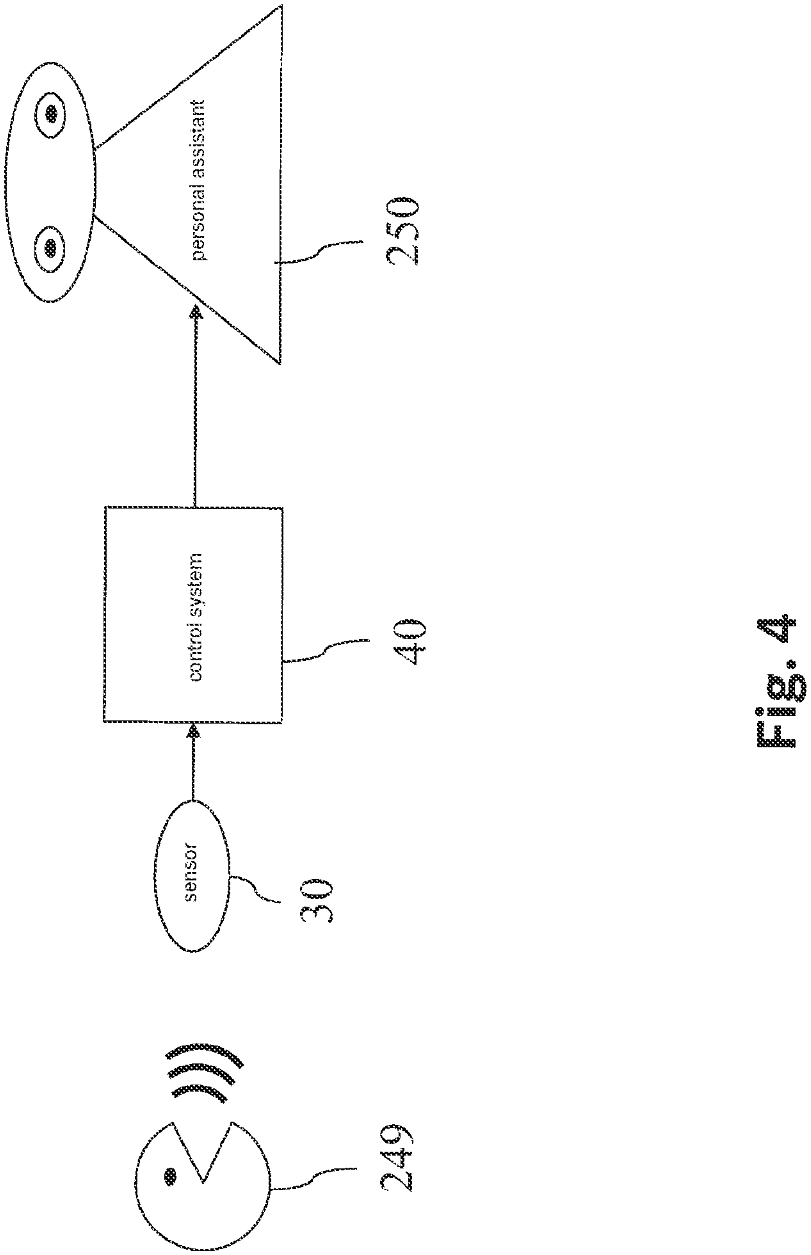
FIG. 4 schematically shows one exemplary embodiment for controlling a personal assistant, in accordance with the present invention.

FIG. 4 shows one exemplary embodiment in which control system 40 is used for controlling a personal assistant 250. Sensor 30 may be one of the sensors mentioned in connection with FIG. 1. Sensor 30 is preferably an acoustic sensor which receives voice signals of a user 249. As an alternative or in addition, sensor 30 may also be configured to receive optical signals, for example video images of a gesture of user 249.

As a function of the signals of sensor 30, control system 40 ascertains an activation signal A of personal assistant 250, for example in that the neural network carries out a gesture recognition. This ascertained activation signal A is then transmitted to personal assistant 250, and it is thus accordingly activated. This ascertained activation signal A may then, in particular, be selected in such a way that it corresponds to a presumed desired activation by user 249. This presumed desired activation may be ascertained as a function of the gesture recognized by neural network 60. Control system 40 may then, as a function of the presumed desired activation, select activation signal A for the transmission to personal assistant 250 and/or select activation A for the transmission to the personal assistant corresponding to the presumed desired activation 250.

This corresponding activation may, for example, include that personal assistant 250 retrieves pieces of information from a database, and renders them adoptable for user 249.

Instead of personal assistant 250, a household appliance (not shown), in particular, a washing machine, a stove, an oven, a microwave or a dishwasher may also be provided to be accordingly activated.

Figure 5:
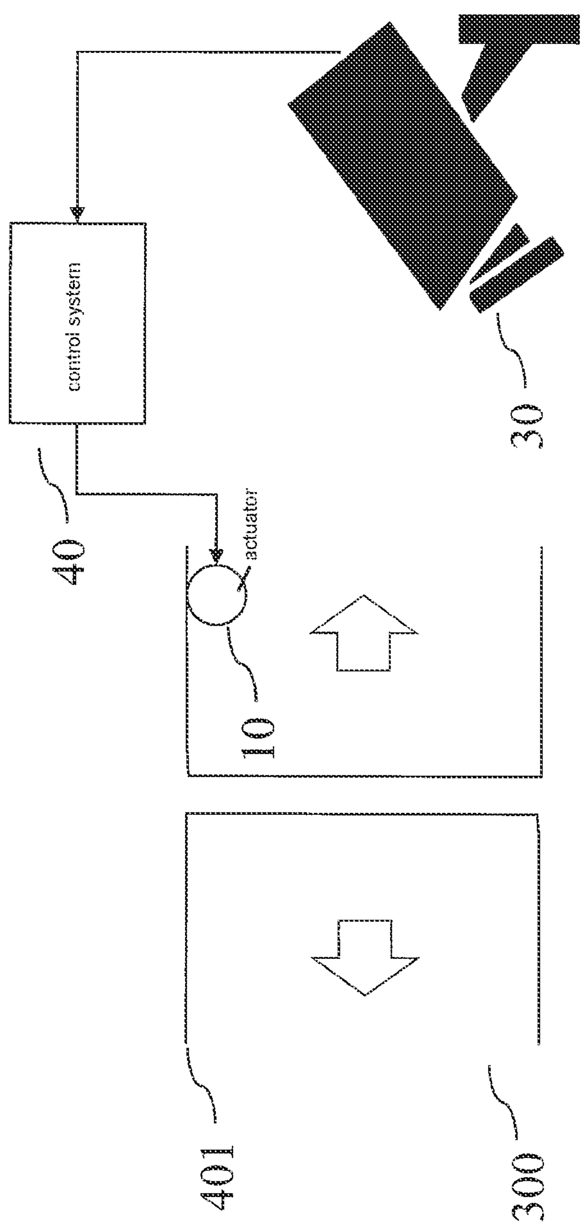
FIG. 5 schematically shows one exemplary embodiment for controlling an access system, in accordance with the present invention.

FIG. 5 shows one exemplary embodiment in which control system 40 is used for controlling an access system 300. Access system 300 may encompass a physical access control, for example a door 401. Sensor 30 may be one of the sensors mentioned in connection with FIG. 1, preferably an optical sensor (for example for detecting image or video data) which is configured to detect a face. This detected image may be interpreted with the aid of neural network 60. For example, the identity of a person may be ascertained. Actuator 10 may be a lock which releases, or does not release, the access control as a function of activation signal A, for example opens, or does not open, door 401. For this purpose, activation signal A may be selected as a function of the interpretation of neural network 60, for example as a function of the ascertained identity of the person. Instead of the physical access control, a logic access control may also be provided.

Figure 6:
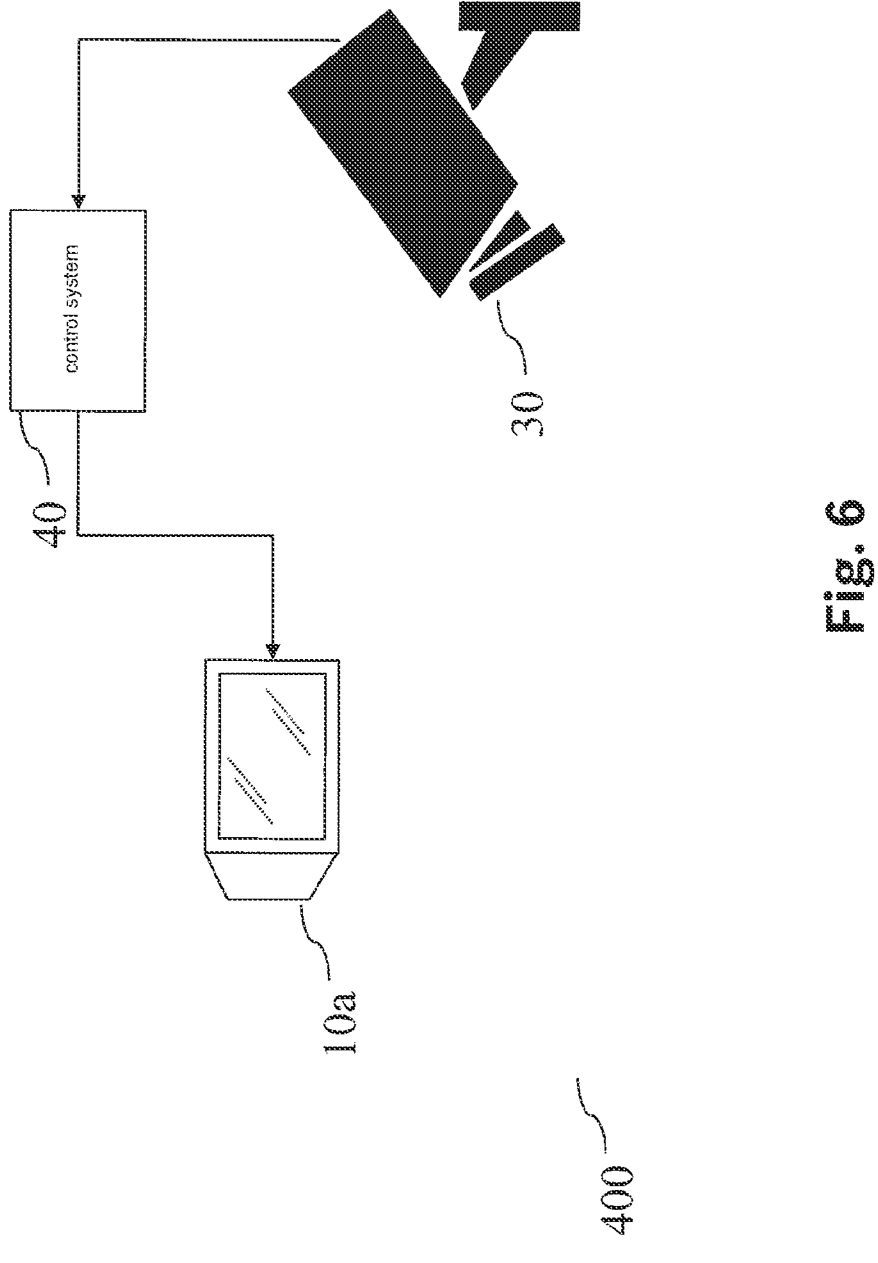
FIG. 6 schematically shows one exemplary embodiment for controlling a monitoring system, in accordance with the present invention.

FIG. 6 shows one exemplary embodiment in which control system 40 is used for controlling a monitoring system 400. This exemplary embodiment differs from the exemplary embodiment shown in FIG. 5 in that, instead of actuator 10, display unit **10*a* is provided, which is activated by control system 40. For example, it may be ascertained by neural network 60 whether an object recorded by the optical sensor is suspicious, and activation signal A may then be selected in such a way that this object is represented highlighted in color by display unit 10*a***.

Figure 7:
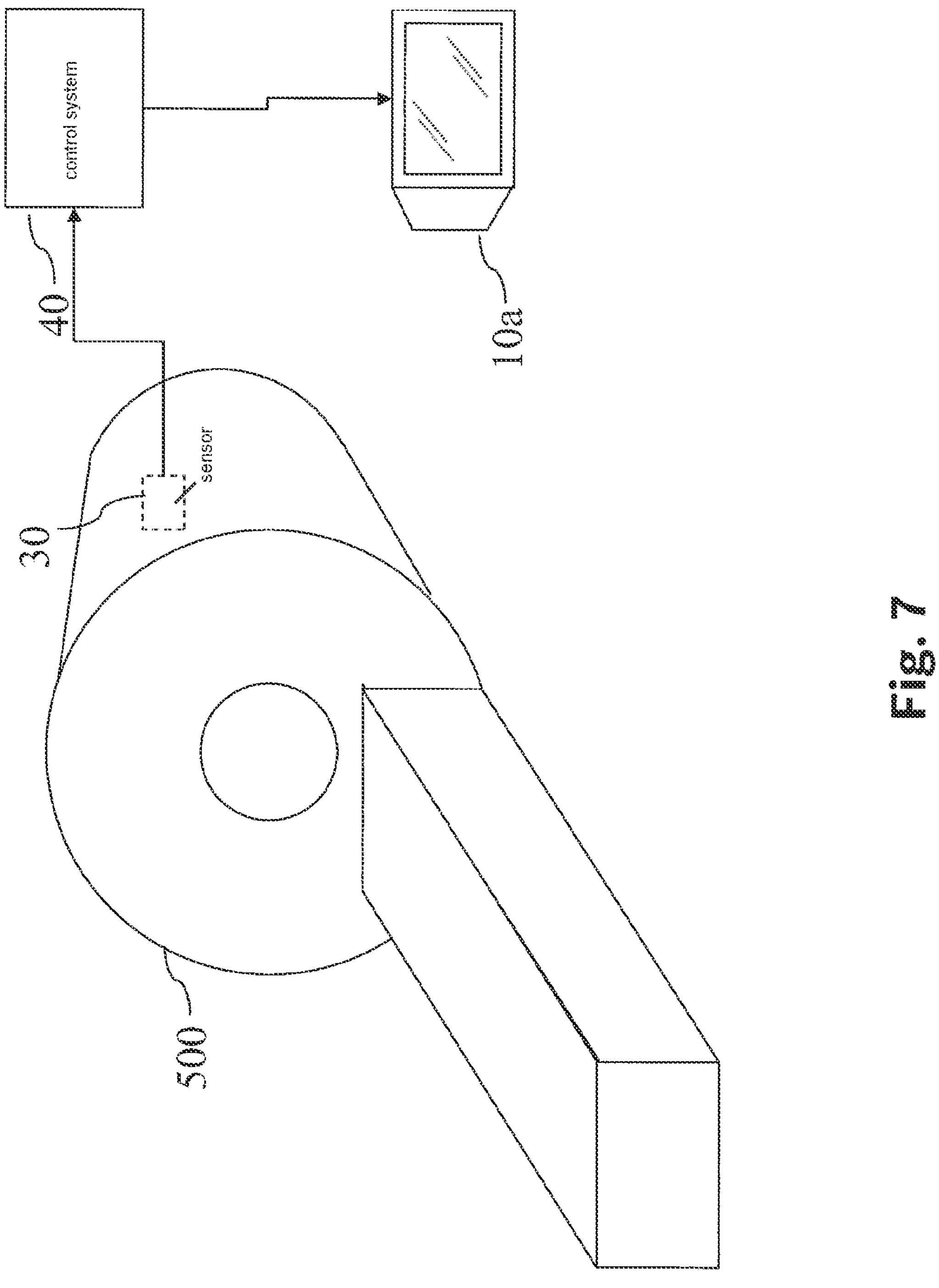
FIG. 7 schematically shows one exemplary embodiment for controlling a medical imaging system, in accordance with the present invention.

FIG. 7 shows one exemplary embodiment in which control system 40 is used for controlling a medical imaging system 500, for example an MRI, X-ray or ultrasound device. Sensor 30 may, for example, be an imaging sensor, and display unit **10*a* is activated by control system 40. For example, it may be ascertained by neural network 60 whether an area recorded by the imaging sensor is noticeable, and activation signal A may then be selected in such a way that this area is represented highlighted in color by display unit 10*a***.

Figure 8:
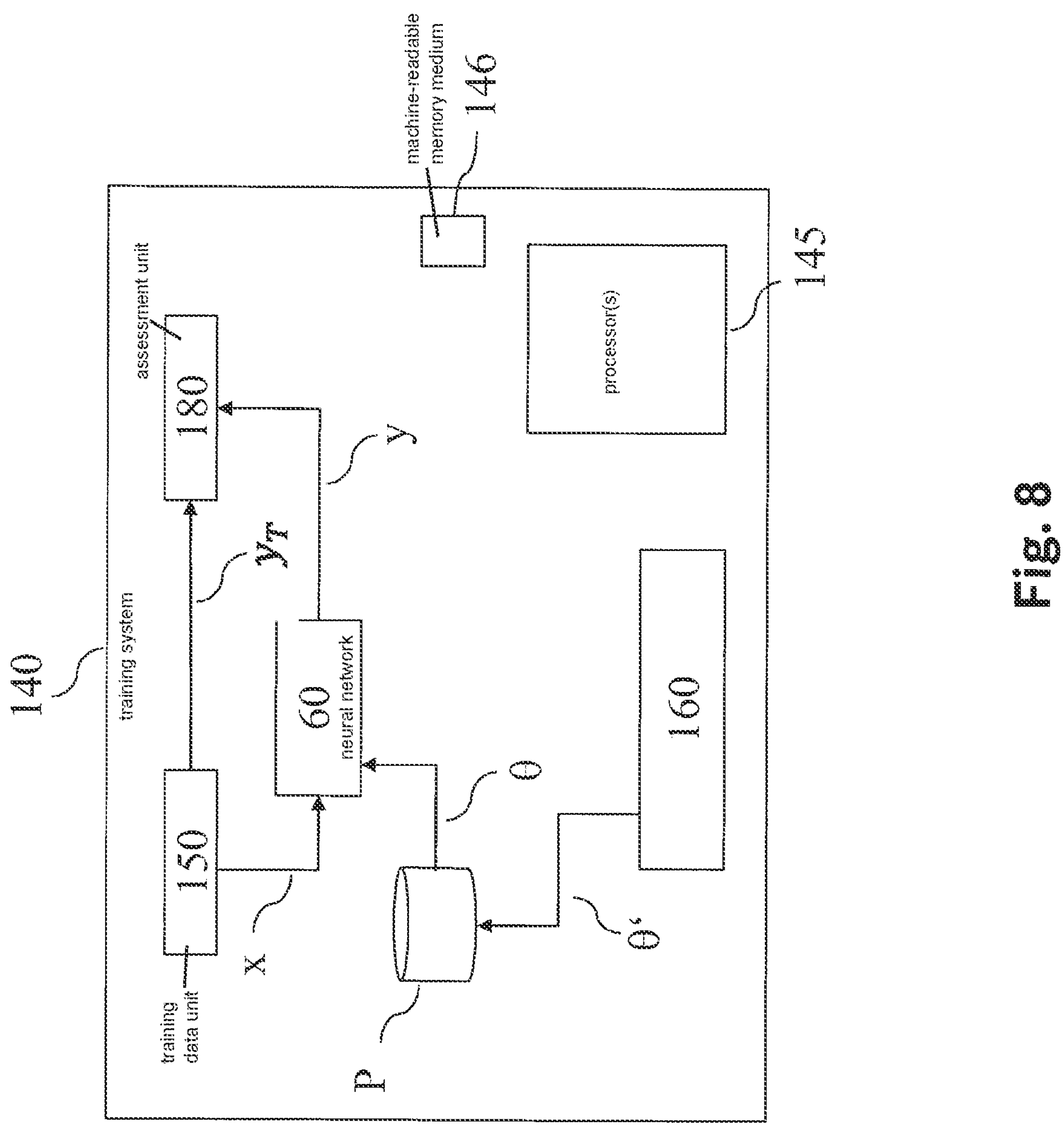
FIG. 8 schematically shows a training system, in accordance with the present invention.

FIG. 8 schematically shows one exemplary embodiment of a training system 140 for training neural network 60 with the aid of a training method. A training data unit 150 ascertains suitable input signals x, which are supplied to neural network 60. For example, training data unit 150 accesses a computer-implemented database in which a set of training data is stored and selects, e.g., randomly, input signals x from the set of training data. Optionally, training data unit 150 also ascertains desired, or "actual," output signals $y_T$ which are assigned to input signals x and supplied to an assessment unit 180.

Artificial neural network x is configured to ascertain associated output signals y from input signals x supplied to it. These output signals y are supplied to assessment unit 180.

Assessment unit 180 may, for example, characterize a performance capability of neural network 60 with the aid of a cost function (loss function) $\mathcal{L}$ which is dependent on output signals y and the desired output signals $y_T$. Parameters θ may be optimized as a function of cost function $\mathcal{L}$.

In further preferred specific embodiments, training system 140 includes one or multiple processor(s) 145 and at least one machine-readable memory medium 146 on which instructions are stored which, when they are executed on processors 145, prompt control system 140 to execute the training method.

Figure 9:
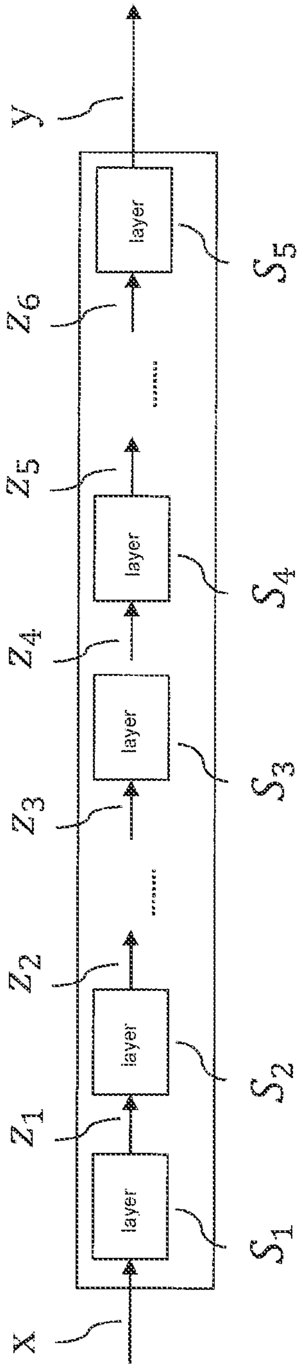
FIG. 9 schematically shows a design of a neural network, in accordance with the present invention.

FIG. 9, by way of example, shows a possible design of neural network 60, which is a neural network in the exemplary embodiment. Neural network includes a multitude of layers $S_1$, $S_2$, $S_3$, $S_4$, $S_5$ for ascertaining, from input signal x which is supplied to an input of an input layer $S_1$, output signal y which is present at an output of an output layer $S_5$. Each of layers $S_1$, $S_2$, $S_3$, $S_4$, $S_5$ is configured to ascertain, from a (possibly multidimensional) input signal x, $z_1$, $z_3$, $z_4$, $z_6$ which is present at an input of the particular layer $S_1$, $S_2$, $S_3$, $S_4$, $S_5$, a (possibly multidimensional) output signal $z_1$, $z_2$, $z_4$, $z_5$,y which is present at an output of the particular layer $S_1$, $S_2$, $S_3$, $S_4$, $S_5$. Such output signals are also referred to as feature maps, specifically in image processing. It is not necessary in the process for layers $S_1$, $S_2$, $S_3$, $S_4$, $S_5$ to be situated in such a way that all output signals, which are incorporated as input signals in further layers, are each incorporated from a preceding layer into a directly following layer. Instead, skip connections or recurrent connections are also possible. It is also possible, of course, for input signal x to be incorporated in several of the layers, or for output signal x of neural network 60 to be made up of output signals of a multitude of layers.

Output layer $S_5$ may, for example, be an Argmax layer (i.e., a layer which, from a multitude of inputs having respective assigned input values, selects a designation of the input whose assigned input value is the greatest among these input values), and one or multiple of layers $S_1$, $S_2$, $S_3$ may be convolutional layers, for example.

A layer $S_4$ is advantageously designed as a scaling layer, which is designed to map an input signal x present at the input of scaling layer $S_4$ in such a way to an output signal y present at the output of scaling layer $S_4$ that output signal y present at the output is a rescaling of input x, parameters which characterize the rescaling being fixedly predefinable.

Exemplary embodiments for methods which scaling layer $S_4$ is able to carry out are described below in connection with FIG. 15.

Figure 10:
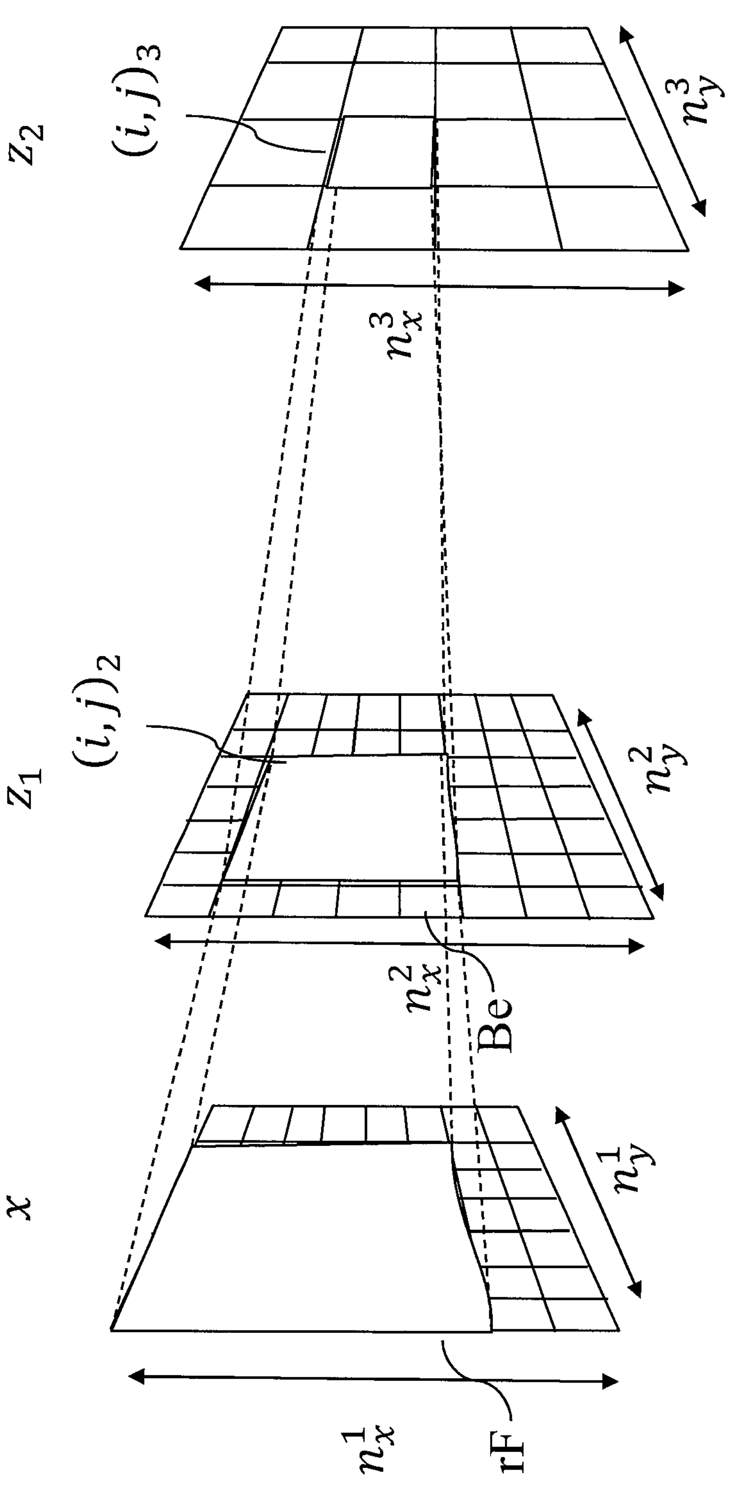
FIG. 10 schematically shows an information forwarding within the neural network, in accordance with the present invention.

FIG. 10 schematically illustrates the information forwarding within neural network 60. Shown schematically here are three multidimensional signals within neural network 60, namely input signal x as well as later feature maps $z_1$, $z_2$. In the exemplary embodiment, input signal x has a spatial resolution of $$n_x^1 \times n_y^1$$

pixels, first feature map $z_1$ has a spatial resolution of $$n_x^2 \times n_y^2$$

pixels, and second feature map $z_2$ has a spatial resolution of $$n_x^3 \times n_y^3$$

pixels. In the exemplary embodiment, the resolution of second feature map $z_2$ is lower than the resolution of input signal x; however, this is not necessarily the case.

Furthermore, a feature, e.g., a pixel, $(i,j)_3$ of second feature map $z_2$ is shown. If the function which ascertains second feature map $z_2$ from first feature map $z_1$ is represented, for example, by a convolutional layer or a fully connected layer, it is also possible that a multitude of features of first feature map $z_1$ is incorporated in the ascertainment of the value of this feature $(i,j)_3$. However, it is also possible, of course, that only a single feature of first feature map $z_1$ is incorporated in the ascertainment of the value of this feature $(i,j)_3$.

In the process, "incorporate" may advantageously be understood to mean that a combination of values of the parameters which characterize the function with which second feature map $z_2$ is ascertained from first feature map $z_1$, and of values of first feature map $z_1$ exists in such a way that the value of feature $(i,j)_3$ depends on the value of the feature being incorporated. The entirety of these features being incorporated is referred to as area Be in FIG. 10.

In turn, one or multiple feature(s) of input signal x is/are incorporated in the ascertainment of each feature $(i,j)_2$ of area Be. The set of all features of input signal x which are incorporated in the ascertainment of at least one of features $(i,j)_2$ of area Be is referred to as receptive field rF of feature $(i,j)_3$. In other words, receptive field rF of feature $(i,j)_3$ encompasses all those features of input signal x which are directly or indirectly (in other words: at least indirectly) incorporated in the ascertainment of feature $(i,j)_3$, i.e., whose values may influence the value of feature $(i,j)_3$.

Figure 11:
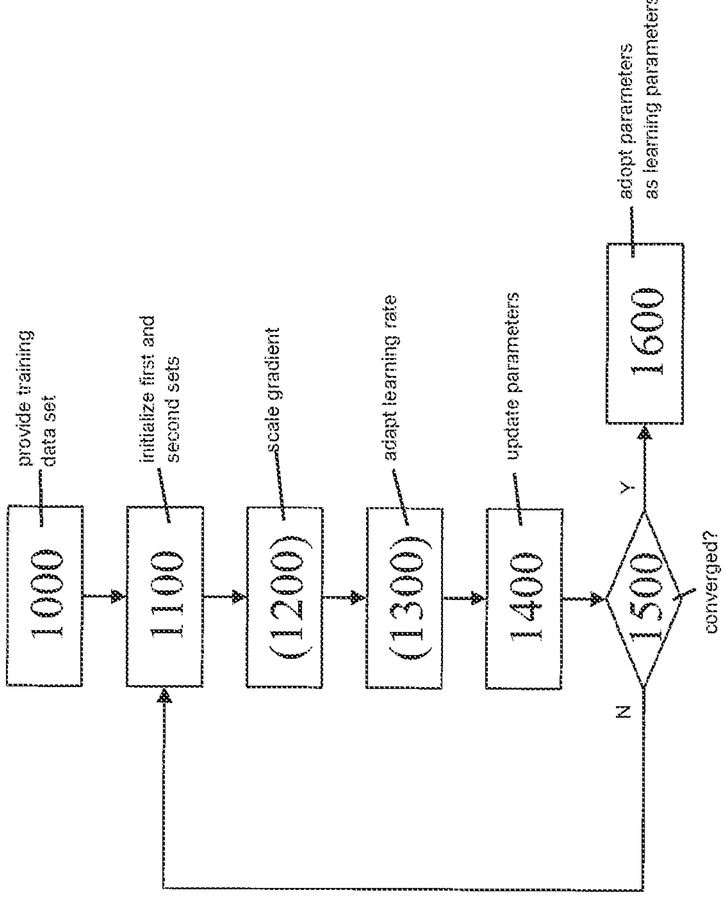
FIG. 11 shows one specific embodiment of a training method in a flowchart, in accordance with the present invention.

FIG. 11 shows the sequence of a method for training neural network 60 according to one specific embodiment in a flowchart.

Initially 1000, a training data set X encompassing pairs $(x_i,y_i)$ made up of input signals $x_i$ and respective associated output signals $y_i$ is provided. A learning rate q is initialized, for example at $\eta=1$.

Figure 12:
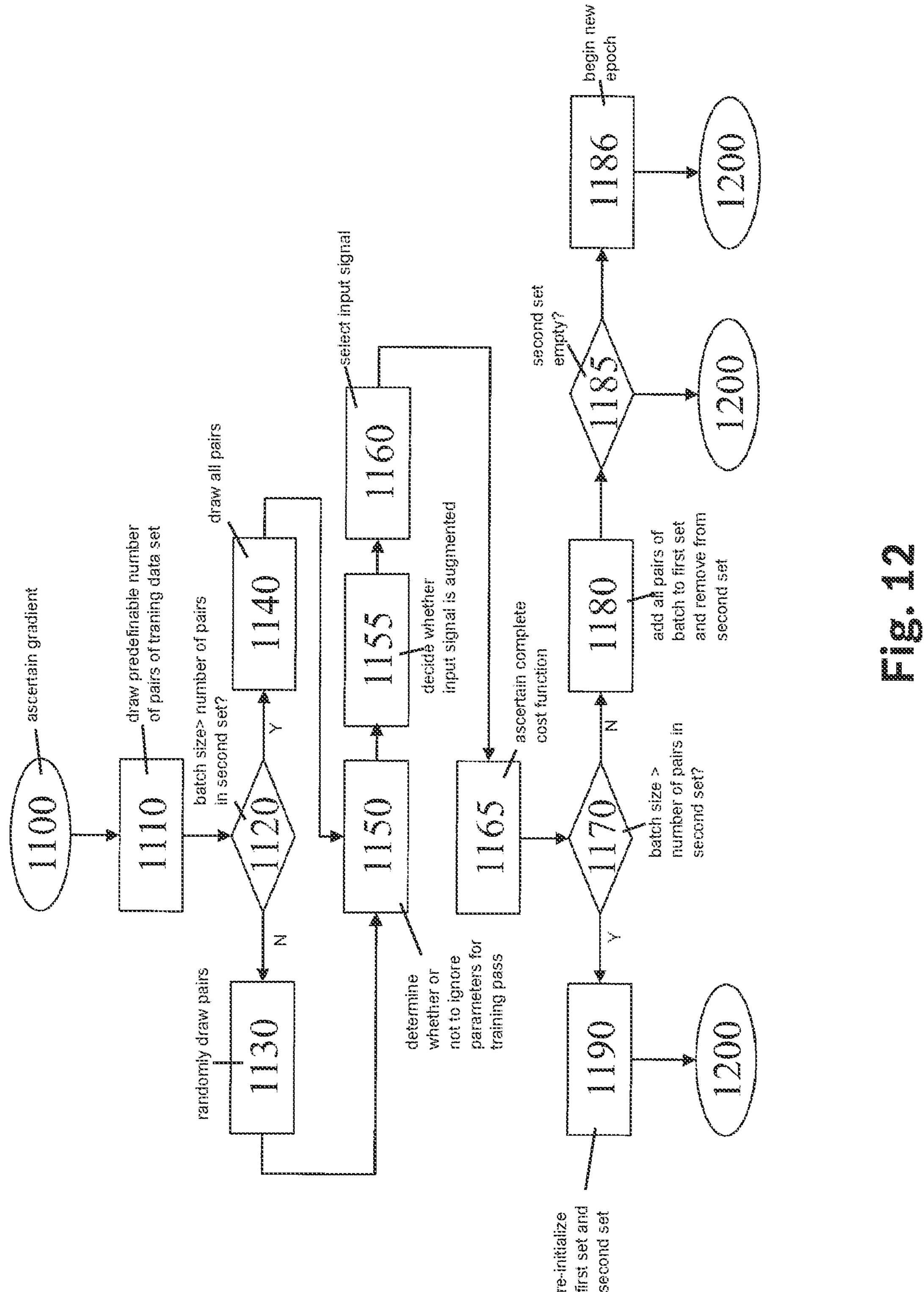
FIG. 12 shows one specific embodiment of a method for estimating a gradient in a flowchart, in accordance with the present invention.
Figure 13:
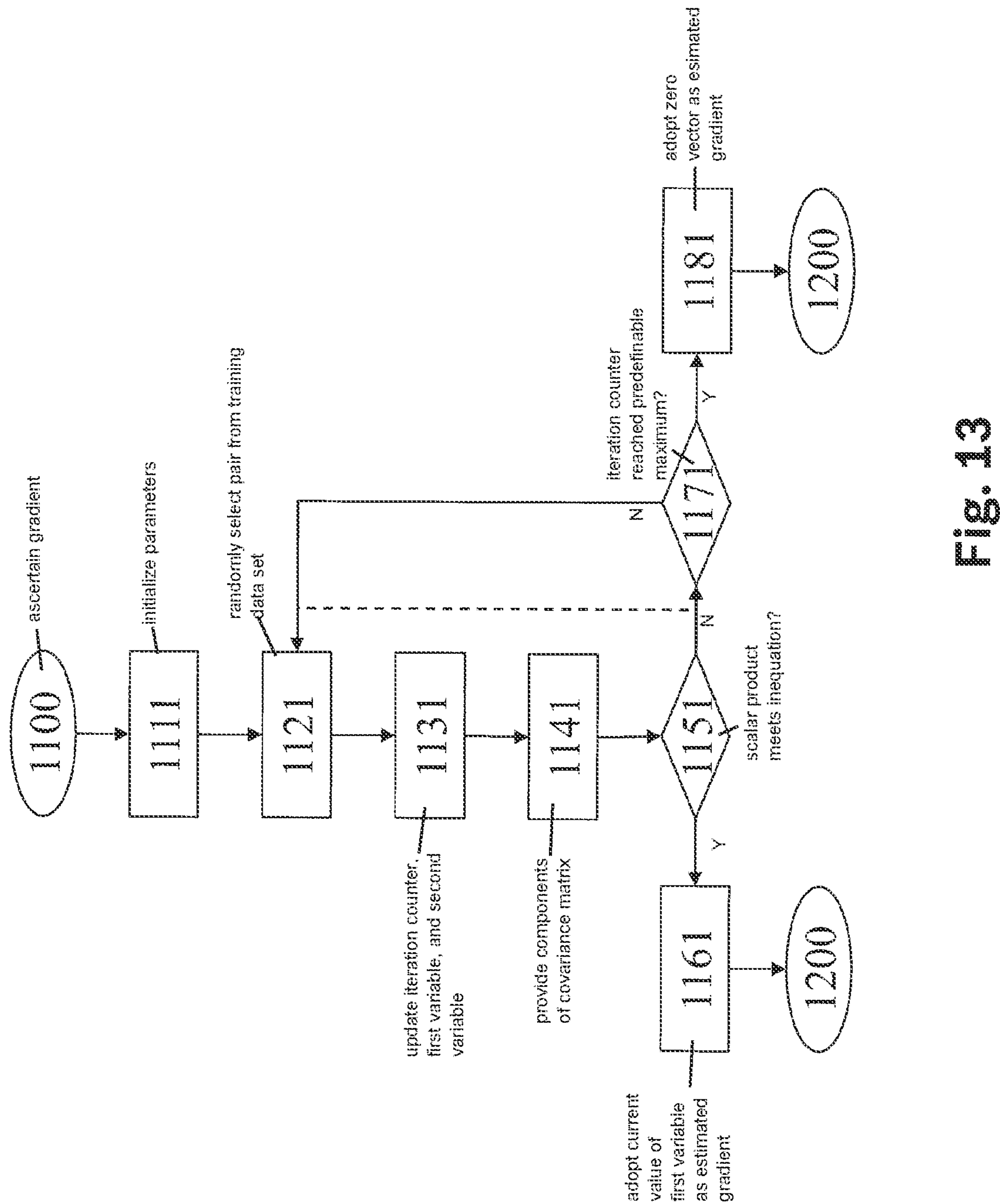
FIG. 13 shows one alternative specific embodiment of the method for estimating the gradient in a flowchart, in accordance with the present invention.

Furthermore, a first set G and a second set N are optionally initialized, for example when in step 1100 the exemplary embodiment of this portion of the method illustrated in FIG. 12 is used. If, in step 1100, the exemplary embodiment of this portion of the method illustrated in FIG. 13 is to be used, the initialization of first set G and of second set N may be dispensed with.

The initialization of first set G and of second set N may take place as follows: First set G, which encompasses those pairs $(x_i,y_i)$ of training data set X which were already drawn during the course of a current epoch of the training method is initialized as an empty set. Second set N, which encompasses those pairs $(x_i,y_i)$ of training data set X which were not yet drawn during the course of the current epoch is initialized by assigning all pairs $(x_i,y_i)$ of training data set X to it.

Now 1100, a gradient g of characteristic $\mathcal{L}$ with respect to parameters θ is estimated, i.e., $g=\nabla_\theta \mathcal{L}$, with the aid of pairs $(x_i,y_i)$ made up of input signals $x_i$ and respective associated output signals $y_i$ of the training data set X. Exemplary embodiments of this method are described in connection with FIG. 12 or 13.

Then 1200, a scaling of gradient g is optionally carried out. Exemplary embodiments of this method are described in connection with FIG. 14.

Thereafter 1300, an adaptation of a learning rate η is optionally carried out. In the process, learning rate η may, for example, be reduced by a predefinable learning rate reduction factor Dη (e.g., Dη=1/10) (i.e., $\eta \leftarrow \eta \cdot D\eta$), provided a number of the passed-through epochs is divisible by a predefinable epoch number, for example 5.

Then 1400, parameters θ are updated with the aid of the ascertained and possibly scaled gradient g and learning rate η. For example, parameters θ are replaced by $\theta-\eta\cdot g$.

It is now 1500 checked, with the aid of a predefinable convergence criterion, whether the method is converged. For example, it may be decided based on an absolute change in parameters θ (e.g., between the last two epochs) whether or not the convergence criterion is met. For example, the convergence criterion may be met exactly when a $L^2$ norm over the change of all parameters θ between the last two epochs is smaller than a predefinable convergence threshold value.

If it was decided that the convergence criterion is met, parameters θ are adopted as learned parameters (step 1600), and the method ends. If not, the method branches back to step 1100.

FIG. 12 illustrates, in a flowchart, an exemplary method for ascertaining gradient g in step 1100.

Initially 1110, a predefinable number bs of pairs $(x_i,y_i)$ of training data set X is to be drawn (without replacement), i.e., selected, and assigned to a batch B. Predefinable number bs is also referred to as a batch size. Batch B is initialized as an empty set.

For this purpose, it is checked 1120 whether batch size bs is greater than the number of pairs $(x_i,y_i)$ which are present in second set N.

If batch size bs is not greater than the number of pairs $(x_i,y_i)$ which are present in second set N, a bs number of pairs $(x_i,y_i)$ are drawn 1130, i.e., selected, randomly from second set N, and added to batch B.

If batch size bs is greater than the number of pairs $(x_i,y_i)$ which are present in second set N, all pairs of second set N whose number is denoted by s are drawn 1140, i.e., selected, and added to batch B, and those remaining, i.e., a bs–s number, are drawn, i.e., selected, from first set G and added to batch B.

Subsequent to 1150 step 1130 or 1140, it is optionally decided for all parameters θ whether or not these parameters θ are to be ignored in this training pass. For this purpose, for example, a probability with which parameters θ of this layer are ignored is separately established for each layer $S_1$, $S_2$, . . . , $S_6$. For example, this probability may be 50% for first layer $S_1$ and be reduced by 10% with each subsequent layer.

With the aid of these established respective probabilities, it may then be decided for each of parameters θ whether or not it is ignored.

It is now 1155 optionally decided for each pair $(x_i,y_i)$ of batch B whether or not the respective input signal $x_i$ is augmented. For each corresponding input signal $x_i$ which is to be augmented, an augmentation function is selected, preferably randomly, and applied to input signal $x_i$. Input signal $x_i$ thus augmented then replaces the original input signal $x_i$. If input signal $x_i$ is an image signal, the augmentation function may be a rotation by a predefinable angle, for example.

Thereafter 1160, the corresponding (and optionally augmented) input signal $x_i$ is selected for each pair $(x_i,y_i)$ of batch B and supplied to neural network 60. Parameters θ of neural network 60 to be ignored are deactivated in the process during the ascertainment of the corresponding output signal, e.g., in that they are temporarily set to the value zero. The corresponding output signal $y(x_i)$ of neural network 60 is assigned to the corresponding pair $(x_i,y_i)$. Depending on output signals $y(x_i)$ and the respective output signals $y_i$ of pair $(x_i,y_i)$ as the desired output signal $y_T$, a respective cost function $\mathcal{L}$ is ascertained.

Then 1165, the complete cost function $\mathcal{L}=\Sigma_{i\in B}\mathcal{L}_i$ is ascertained for all pairs $(x_i,y_i)$ of batch B together, and the corresponding component of gradient g is ascertained for each of parameters θ not to be ignored, e.g., with the aid of backpropagation. For each of parameters θ to be ignored, the corresponding component of gradient g is set to zero.

Now, it is checked 1170 whether it was established, during the check in step 1000, that batch size bs is greater than the number of pairs $(x_i,y_i)$ which are present in second set N.

If it was established that batch size bs is not greater than the number of pairs $(x_i,y_i)$ which are present in second set N, all pairs $(x_i,y_i)$ of batch B are added 1180 to first set G and removed from second set N. It is now checked 1185 whether second set N is empty. If second set N is empty, a new epoch begins (1186). For this purpose, first set G is again initialized as an empty set, and second set N is newly initialized in that all pairs $(x_i,y_i)$ of training data set X are assigned to it again, and the method branches off to step 1200. If second set N is not empty, the method branches off directly to step 1200.

If it was established that batch size bs is greater than the number of pairs $(x_i,y_i)$ which are present in second set N, first set G is re-initialized 1190 by assigning to it all pairs $(x_i,y_i)$ of batch B, second set N is newly initialized by assigning to it again all pairs $(x_i,y_i)$ of training data set X, and subsequently pairs $(x_i,y_i)$ which are also present in batch B are removed. Thereafter, a new epoch begins, and the method branches off to step 1200. With this, this portion of the method ends.

FIG. 13 illustrates, in a flowchart, another exemplary method for ascertaining gradient g in step 1100. First, parameters of the method are initialized 1111. Hereafter, the mathematical space of parameters θ is denoted by W. If parameters θ thus encompass an np number of individual parameters, space W is an np-dimensional space, for example $W=\mathbb{R}^{np}$. An iteration counter n is initialized to the value n=0, a first variable $m_1$ is then set as $m_1=0\in W$ (i.e., as np-dimensional vector), and a second variable as $m_2=0\in W\otimes W$ (i e., as np×np-dimensional matrix).

Thereafter 1121, a pair $(x_i,y_i)$ is randomly selected from training data set X and, if necessary, is augmented. This may, for example, take place in such a way that, for each input signal $x_i$ of pairs $(x_i,y_i)$ of training data set X, a $\mu(\alpha(x_i))$ number of possible augmentations $\alpha(x_i)$ is ascertained, and to each pair $(x_i,y_i)$ a position variable $$p_i = \frac{\sum_{j<i} p_j}{\sum_j p_j} \quad (2)$$

is assigned. If a random number $\varphi\in[0;1]$ is then drawn in a uniformly distributed manner, position variable $p_i$ which meets the inequation chain $$p_i \le \varphi < p_{i+1} \quad (3)$$

may be selected. The associated index i then denotes the selected pair $(x_i,y_i)$, and an augmentation $\alpha_i$ of input variable $x_i$ may be drawn randomly from the set of possible augmentations $\alpha(x_i)$ and be applied to input variable $x_i$, i.e., the selected pair $(x_i,y_i)$ is replaced by $(\alpha_i(x_i),y)$.

Input signal $x_i$ is supplied to neural network 60. Depending on the corresponding output signal $y(x_i)$ and output signal $y_i$ of pair $(x_i,y_i)$ as the desired output signal $Y_T$, the corresponding cost function $\mathcal{L}$ is ascertained. For parameters θ, a gradient d in this regard is ascertained, e.g., with the aid of backpropagation, i.e., $d=\nabla_0\mathcal{L}(y(x_i),y_i)$.

Then 1131, iteration counter n, first variable $m_1$ and second variable $m_2$ are updated as follows:

$$n \leftarrow n+1 \quad t = \frac{1}{n} \tag{4}$$

$$m_1 = (1-t)\cdot m_1 + t\cdot d \tag{5}$$

$$m_2 = (1-t)\cdot m_2 + t\cdot (d\cdot d^T) \tag{6}$$

Thereafter 1141, components $C_{a,b}$ of a covariance matrix C are provided as $$C_{a,b} = \frac{1}{n}(m_2 - m_1\cdot m_1^T)_{a,b}. \tag{7}$$

From this, using the (vector-valued) first variable $m_1$, a scalar product S is formed, i.e., $$S = \langle m_1, C^{-1} m_1 \rangle. \tag{8}$$

It shall be understood that for the sufficiently precise ascertainment of scalar product S using equation (8), not all entries of covariance matrix C or of the inverse $C^{-1}$ must be present at the same time. It is more memory-efficient, during the evaluation of equation (8), to determine entries $C_{a,b}$ of covariance matrix C needed then.

It is then checked 1151 whether this scalar product S meets the following inequation:

$$S \geq \lambda^2, \tag{9}$$

λ being a predefinable threshold value which corresponds to a confidence level.

If the inequation is met, the current value of first variable $m_1$ is adopted as estimated gradient g (step 1161) and the method branches back to step 1200.

If the inequation is not met, the method can branch back to step 1121. As an alternative, it may also be checked 1171 whether iteration counter n has reached a predefinable maximum iteration value $n_{max}$. If this is not the case, the method branches back to step 1121; otherwise, zero vector $0 \in W$ is adopted 1181 as estimated gradient g, and the method branches back to step 1200. With this, this portion of the method ends.

As a result of this method, it is achieved that $m_1$ corresponds to an arithmetic mean of the ascertained gradient d over the drawn pairs $(x_i, y_i)$, and $m_2$ corresponds to an arithmetic mean of a matrix product $d\cdot d^T$ of the ascertained gradient d over the drawn pairs $(x_i, y_i)$.

Figure 14:
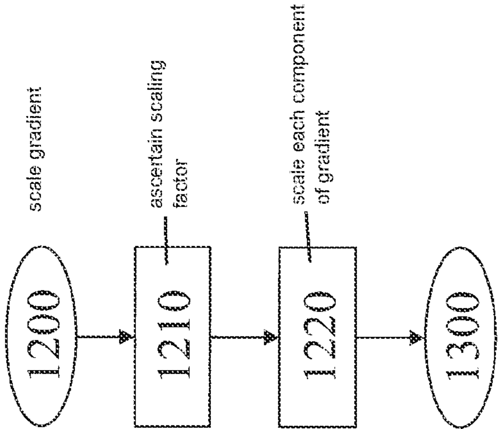
FIG. 14 shows one specific embodiment of a method for scaling the estimated gradient in a flowchart, in accordance with the present invention.

FIG. 14 shows one specific embodiment of the method for scaling gradient g in step 1200. Hereafter, each component of gradient g is denoted by a pair $(\iota, l)$, $\iota \in \{1, \ldots, k\}$ denoting a layer of the corresponding parameter θ, and $l \in \{1, \ldots, \dim(V_i)\}$ denoting a numbering of the corresponding parameter θ within the ι-th layer. If the neural network is designed, as illustrated in FIG. 10, for processing multidimensional input data x using corresponding feature maps $z_\iota$ in the ι-th layer, numbering l is advantageously given by the position of the feature in feature map $z_i$ with which the corresponding parameter θ is associated.

Now 1210, a scaling factor $\Omega_{\iota,l}$ is ascertained for each component $g_{\iota,l}$ of gradient g. For example, this scaling factor $\Omega_{\iota,l}$ may be the size of receptive field rF of the feature of the feature map of the ι-th layer corresponding to l. As an alternative, scaling factor $\Omega_{\iota,l}$ may also be a ratio of the resolutions, i.e., the number of features, of the ι-th layer in relation to the input layer.

Then 1220, each component $g_{\iota,l}$ of gradient g is scaled using scaling factor $\Omega_{\iota,l}$, i.e., $$g_{\iota,l} \leftarrow g_{\iota,l} / \Omega_{\iota,l}. \tag{10}$$

If scaling factor $\Omega_{\iota,l}$ is given by the size of receptive field rF, overfitting of parameters θ may be avoided particularly effectively. If scaling factor $\Omega_{\iota,l}$ is given by the ratio of the resolutions, this is a particularly efficient approximate estimation of the size of receptive field rF.

FIGS. 15*a*)-15*c*) illustrate specific embodiments of the method which is executed by scaling layer $S_4$.

Scaling layer $S_4$ is configured to achieve a projection of input signal x present at the input of scaling layer $S_4$ to a ball, having radius ρ and center c. This is characterized by a first norm $N_1(y-c)$, which measures a distance of center c from output signal x present at the output of scaling layer $S_4$, and a second norm $N_2(x-y)$, which measures a distance of input signal x present at the input of scaling layer $S_4$ from output signal y present at the output of scaling layer $S_4$. In other words, output signal y present at the output of scaling layer $S_4$ solves equation $$y = \operatorname{argmin}_{N_1(y-c)\leq\rho} N_2(x-y). \tag{11}$$

FIG. 15 a) illustrates a particularly efficient first specific embodiment for the case that first norm $N_1$ and a second norm $N_2$ are identical. They are denoted hereafter by $\|\bullet\|$.

Initially 2000, an input signal x present at the input of scaling layer $S_4$, a center parameter c and a radius parameter ρ are provided.

Then 2100, an output signal y present at the output of scaling layer $S_4$ is ascertained as $$y = c + \frac{\rho\cdot(x-c)}{\max(\rho, \|x-c\|)}. \tag{12}$$

With this, this portion of the method ends.

FIGS. 15*b*) and 15*c*) illustrate specific embodiments for particularly advantageously selected combinations of first norm $N_1$ and second norm $N_2$.

FIG. 15*b*) illustrates a second specific embodiment for the case that, in condition 12 to be met, first norm $N_1(\bullet)$ is maximum norm and second norm $N_2(\bullet)$ is 2-norm$\|\bullet\|_2$. This combination of norms may be computed particularly efficiently.

First 3000, similarly to step 2000, input signal x present at the input of scaling layer $S_4$, center parameter c and radius parameter ρ are provided.

Then 3100, components $y_i$ of output signal y present at the output of scaling layer $S_4$ are ascertained as $$y_i = \begin{cases} c_i + \rho & \text{if } x_i - c_i > \rho \\ c_i - \rho & \text{if } x_i - c_i < -\rho, \\ x_i & \text{else} \end{cases} \tag{13}$$

i denoting the components here.

This method is particular processing-efficient. With this, this portion of the method ends.

FIG. 15*c*) illustrates a third specific embodiment for the case that, in condition 12 to be met, first norm $N_1(\bullet)$ is 1-norm$\|\bullet\|_1$, and second norm $N_2(\bullet)$ is 2-norm$\|\bullet\|_2$. As a result of this combination, as small components as possible are set to the value zero in input signal x present at the input of scaling layer $S_4$.

First 4000, similarly to step 2000, input signal x present at the input of scaling layer $S_4$, center parameter c and radius parameter $\rho$ are provided.

Then 4100, a sign variable $\epsilon_i$ is ascertained as $$\epsilon_i = \begin{cases} +1 & \text{if } x_i \geq c_i \\ -1 & \text{if } x_i < c_i \end{cases} \tag{14}$$

and components $x_i$ of input signal x present at the input of scaling layer $S_4$ are replaced by $$x_i \leftarrow \epsilon_i \cdot (x_i - c_i). \tag{15}$$

An auxiliary parameter $\gamma$ is initialized to the value zero.

Then 4200, a set N is ascertained as $N=\{i|x_i>\gamma\}$ and a distance dimension $D=\Sigma\Sigma_{i\in N}(x_i-\gamma)$.

Then 4300, it is checked whether inequation $$D > \rho \tag{16}$$

is met.

If this is the case 4400, auxiliary parameter $\gamma$ is replaced by $$\gamma \leftarrow \gamma + \frac{D-\rho}{|N|}, \tag{17}$$

and the method branches back to step 4200.

If inequation (16) is not met 4500, components $y_i$ of output signal y present at the output of scaling layer $S_4$ is ascertained as $$y_i = c_i + \epsilon_i \cdot (x_i - \gamma)_+ \tag{18}$$

Notation $(\bullet)_+$ usually denotes $$(\xi)_+ = \begin{cases} \xi & \text{if } \xi > 0 \\ 0 & \text{else]} \end{cases}. \tag{19}$$

With this, this portion of the method ends. This method corresponds to a Newton's method and is particularly processing-efficient, in particular, when many of the components of input signal x present at the input of scaling layer $S_4$ are important.

Figure 16:
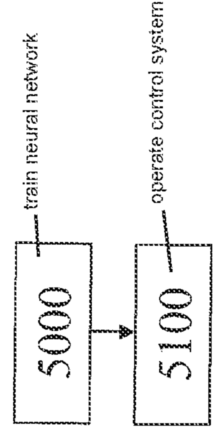
FIG. 16 shows a method for operating the trained neural network in a flowchart, in accordance with an example embodiment of the present invention.

FIG. 16 illustrates one specific embodiment of a method for operating neural network 60. First 5000, the neural network is trained using one of the described methods. Then 5100, control system 40 is operated as described using neural network 60 thus trained. With this, the method ends.

It shall be understood that the neural network is not limited to feedforward neural networks, but that the present invention may equally be applied to any kind of neural network, in particular, recurrent networks, convolutional neural networks, autoencoders, Boltzmann machines, perceptrons or capsule neural networks.

The term "computer" encompasses arbitrary devices for processing predefinable processing rules. These processing rules may be present in the form of software, or in the form of hardware, or also in a mixed form made up of software and hardware.

It shall furthermore be understood that the methods cannot only be implemented completely in software as described. They may also be implemented in hardware, or in a mixed form made up of software and hardware.

What is claimed is:

1. A computer-implemented method for training a neural network, the neural network being configured to classify physical measuring variables, the method comprising the following steps:

training the neural network using a training data set, including:

drawing pairs, each including an input signal and an associated output signal, from the training data set for the training; and adapting parameters of the neural network as a function of a respective output signal of the neural network, when the input signal of a drawn pair is supplied, and as a function of the associated output signal of the drawn pair;

wherein the drawing of the pairs always takes place from the entire training data set;

wherein the drawing of the pairs occurs regardless of which pair were previously drawn during the course of the training, wherein the input signal of the drawn pair is augmented using an augmentation function, wherein the augmentation function generates a variation of the input signal which leaves a classification of the input signal corresponding to an output signal of the neural network unchanged, wherein the augmentation function is selected from a set of provided augmentation functions which is dependent on the input signal of the drawn pair, wherein, during the drawing of the pairs from the training data set, a probability that a predefinable pair is drawn is dependent on a number of provided augmentation functions of the input signal of the predefinable pair, and wherein the variation is a rotation by a predefinable angle.

2. The method as recited in claim 1, wherein the adaptation of the parameters occurs as a function of an ascertained gradient and, for the ascertainment of the gradient, an estimated value of the gradient is refined, by taking a successively increasing number of pairs which are drawn from the training data set into consideration, until a predefinable termination condition which is dependent on the estimated value of the gradient is met.

3. The method as recited in claim 2, wherein the predefinable termination condition is also dependent on a covariance matrix of the estimated value of the gradient.

4. The method as recited in claim 3, wherein the predefinable termination condition encompasses a condition of whether the estimated value ($m_1$) and the covariance matrix (C) for a predefinable confidence value ($\lambda$) meet the condition $(m_1, C^{-1}m_1) \geq \lambda^2$.

5. A training system configured to train a neural network, the neural network being configured to classify physical measuring variables, the training system configured to:

train the neural network using a training data set, including:

draw pairs, each including an input signal and an associated output signal, from the training data set for the training; and adapt parameters of the neural network as a function of a respective output signal of the neural network, when the input signal of a drawn pair is supplied, and as a function of the associated output signal of the drawn pair;

wherein the drawing of the pairs always takes place from the entire training data set;

wherein the drawing of the pairs occurs regardless of which pair were previously drawn during the course of the training, wherein the input signal of the drawn pair is augmented using an augmentation function, wherein the augmentation function generates a variation of the input signal which leaves a classification of the input signal corresponding to an output signal of the neural network unchanged, wherein the augmentation function is selected from a set of provided augmentation functions which is dependent on the input signal of the drawn pair, wherein, during the drawing of the pairs from the training data set, a probability that a predefinable pair is drawn is dependent on a number of provided augmentation functions of the input signal of the predefinable pair, and wherein the variation is a rotation by a predefinable angle.

6. A method of using a neural network, the neural network being trained by drawing pairs, each including an input signal and an associated output signal, from the training data set for the training, and adapting parameters of the neural network as a function of a respective output signal of the neural network, when the input signal of a drawn pair is supplied, and as a function of the associated output signal of the drawn pair, wherein the drawing of the pairs always takes place from the entire training data set, and wherein the drawing of the pairs occurs regardless of which pair were previously drawn during the course of the training, the method comprising:

classifying first input signals which are present at an input of the neural network and were ascertained as a function of an output signal of a sensor, wherein the input signal of the drawn pair is augmented using an augmentation function, wherein the augmentation function generates a variation of the input signal which leaves a classification of the input signal corresponding to an output signal of the neural network unchanged, wherein the augmentation function is selected from a set of provided augmentation functions which is dependent on the input signal of the drawn pair, wherein, during the drawing of the pairs from the training data set, a probability that a predefinable pair is drawn is dependent on a number of provided augmentation functions of the input signal of the predefinable pair, and wherein the variation is a rotation by a predefinable angle; and controlling an actuator based on the output of the neural network, the actuator actuating one of a robot or a motor vehicle.

7. A method of using a neural network, the neural network being trained by drawing pairs, each including an input signal and an associated output signal, from the training data set for the training, and adapting parameters of the neural network as a function of a respective output signal of the neural network, when the input signal of a drawn pair is supplied, and as a function of the associated output signal of the drawn pair, wherein the drawing of the pairs always takes place from the entire training data set, and wherein the drawing of the pairs occurs regardless of which pair were previously drawn during the course of the training, the method comprising:

providing an activation signal for activating an actuator as a function of an first output signal of the neural network which is present at an output of the neural network, wherein the input signal of the drawn pair is augmented using an augmentation function, wherein the augmentation function generates a variation of the input signal which leaves a classification of the input signal corresponding to an output signal of the neural network unchanged, wherein the augmentation function is selected from a set of provided augmentation functions which is dependent on the input signal of the drawn pair, wherein, during the drawing of the pairs from the training data set, a probability that a predefinable pair is drawn is dependent on a number of provided augmentation functions of the input signal of the predefinable pair, wherein the variation is a rotation by a predefinable angle, and wherein in response to the activation signal the actuator actuates one of a robot or a motor vehicle.

8. A non-transitory machine-readable memory medium on which is stored a computer program for training a neural network, the neural network being configured to classify physical measuring variables, the computer program, when executed by a computer, causing the computer to perform the following steps:

training the neural network using a training data set, including:

drawing pairs, each including an input signal and an associated output signal, from the training data set for the training; and adapting parameters of the neural network as a function of a respective output signal of the neural network, when the input signal of a drawn pair is supplied, and as a function of the associated output signal of the drawn pair;

wherein the drawing of the pairs always takes place from the entire training data set;

wherein the drawing of the pairs occurs regardless of which pair were previously drawn during the course of the training, wherein the input signal of the drawn pair is augmented using an augmentation function, wherein the augmentation function generates a variation of the input signal which leaves a classification of the input signal corresponding to an output signal of the neural network unchanged, wherein the augmentation function is selected from a set of provided augmentation functions which is dependent on the input signal of the drawn pair, wherein, during the drawing of the pairs from the training data set, a probability that a predefinable pair is drawn is dependent on a number of provided augmentation functions of the input signal of the predefinable pair, and wherein the variation is a rotation by a predefinable angle.

9. A method for using a neural network, the method comprising:

training the neural network using a training data set in a first phase, the neural network being trained by:

drawing pairs, each including an input signal and an associated output signal, from the training data set for the training, and adapting parameters of the neural network as a function of a respective output signal of the neural network, when the input signal of a drawn pair is supplied, and as a function of the associated output signal of the drawn pair, wherein the drawing of the pairs always takes place from the entire training data set, wherein the drawing of the pairs occurs regardless of which pair were previously drawn during the course of the training; and providing an activation signal for activating an actuator as a function of an first output signal of the neural network which is present at an output of the neural network, wherein the input signal of the drawn pair is augmented using an augmentation function, wherein the augmentation function generates a variation of the input signal which leaves a classification of the input signal corresponding to an output signal of the neural network unchanged, wherein the augmentation function is selected from a set of provided augmentation functions which is dependent on the input signal of the drawn pair, wherein, during the drawing of the pairs from the training data set, a probability that a predefinable pair is drawn is dependent on a number of provided augmentation functions of the input signal of the predefinable pair, and wherein the variation is a rotation by a predefinable angle, and wherein in response to the activation signal the actuator actuates one of a robot or a motor vehicle.

* * * * *